Nov. 28, 1950         LA VERNE R. BIASELL                 2,532,007
            ACCESSORY FOR CONVERTING A VEHICLE SEAT INTO
                     A PLAY PEN OR CHILD'S BED
                       Filed June 27, 1947
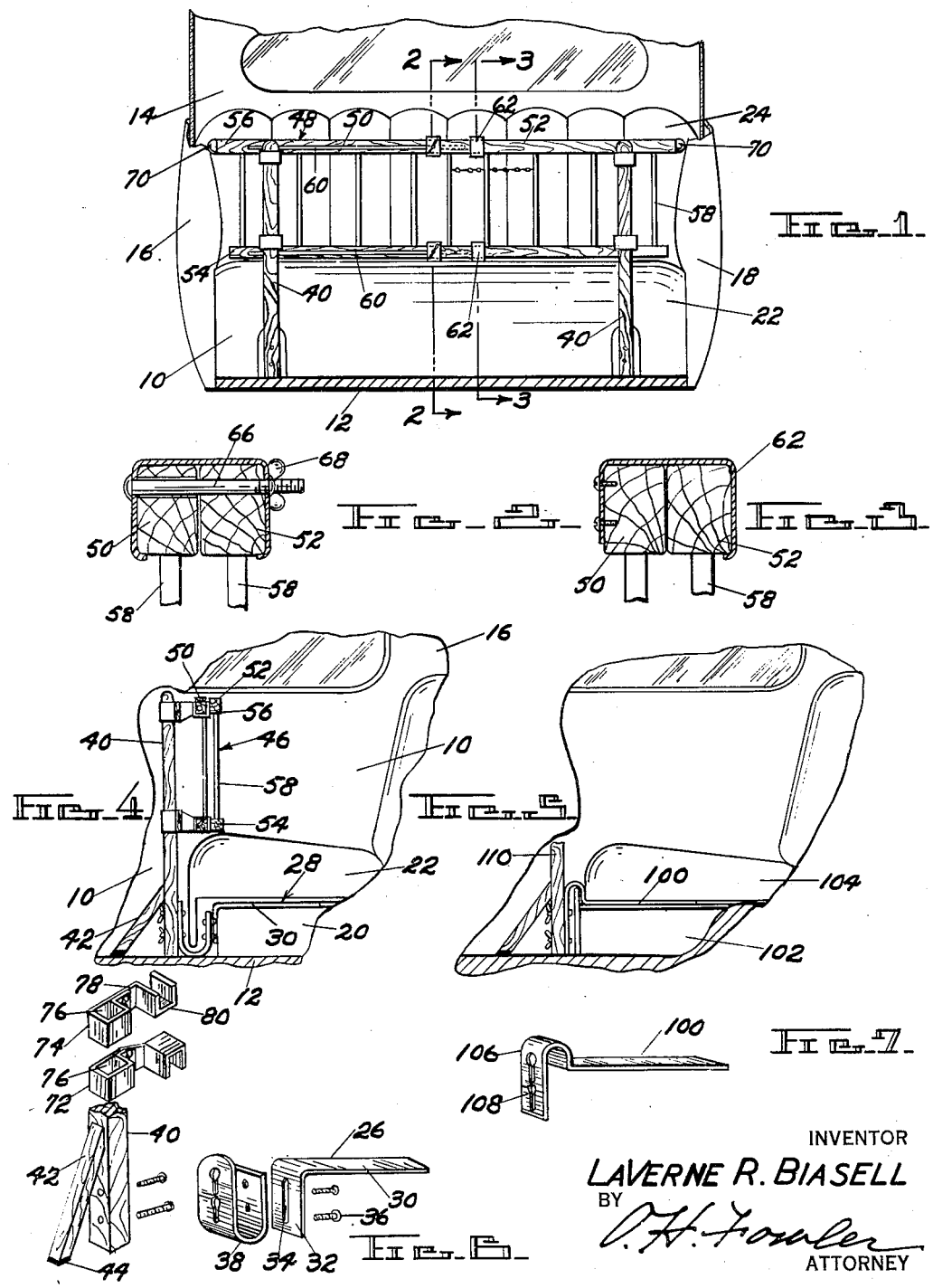
INVENTOR
LAVERNE R. BIASELL
BY
O. H. Fowler
ATTORNEY Patented Nov. 28, 1950

2,532,007

UNITED STATES PATENT OFFICE 2,532,007

ACCESSORY FOR CONVERTING A VEHICLE SEAT INTO A PLAY PEN OR CHILD'S BED

La Verne R. Biasell, Detroit, Mich.

Application June 27, 1947, Serial No. 757,632

6 Claims. (Cl. 5—94)

This invention relates to automobile accessories and more particularly to a shield for cooperation with a seat of an automobile to provide a combination play pen and bed for a child.

An object of the invention is to provide a collapsible shield for use in combination with a seat of an automobile.

Another object of the invention is to provide a shield for use in combination with a seat of an automobile characterized in that it may be easily and quickly installed or removed and packed in a small space.

Another object of the invention is to provide a shield for use in combination with a seat of an automobile, characterized in that it may be easily adjusted to compensate for the height and width of conventional seats for automobiles.

Another object of the invention is to provide a detachable shield for a seat of an automobile characterized in that it may be adjusted to shield a portion of the seat span.

A further object of the invention is to provide a shield for cooperation with a seat of an automobile which may be quickly installed in front of the seat so as to provide in combination therewith a play pen and a bed for a child.

Yet a further object of the invention is to provide a shield for cooperation with a seat of an automobile characterized in that it provides in combination with a seat a play pen and a bed for the child, and in addition thereto will save the child from injury in the event the child is thrown against the shield, as may happen upon a sudden stop of the automobile.

Other objects and advantages of the invention will appear from the following description when taken in connection with the drawings forming a part of this specification and in which:

Fig. 1 is a front elevation of the back seat of an automobile illustrating the invention;

Fig. 2 is a cross sectional view substantially on line 2—2, Fig. 1;

Fig. 3 is a cross sectional view substantially on line 3—3, Fig. 1;

Fig. 4 is an end elevation of the seat illustrating the guard as applied;

Fig. 5 is a similar view illustrating a modification of the supporting bracket;

Fig. 6 is an exploded view of one of the supports and the associated fittings; and Fig. 7 is a perspective view of a modified support.

Referring to the drawings for more specific details of the invention 10 represents a compartment of an automobile including a floor section 12, an end wall 14 and side walls 16 and 18. Each of the walls has a window therein, and a support 20 on the floor section 12 receives a seat 22 having a back 24 supported on the end wall 14.

Corresponding brackets 26 and 28 are arranged in spaced relation to one another at any desirable location along the span of the seat. As shown, each of the brackets include a flat shank 30 adapted to be slipped beneath the seat 22 and a lateral arm 32 extended downwardly in parallel relation to the face of the support 20, and the arm is slotted, as indicated at 34.

Bolts 36 passed through the slots 34 serve to adjustably support U-shaped members 38 to which corresponding uprights 40 are detachably secured, and the uprights have forwardly extended legs 42 cushioned as indicated at 44. The members 38 are more or less resilient so as to yieldingly support the uprights and legs 42 cushioned on the floor section 12, serve to limit movement of the uprights.

An adjustable shield indicated generally at 48 is supported on the uprights in parallel relation to, in front of and above the seat. As shown, the shield includes two corresponding sections or parts 50 and 52, adjustably secured together. Each of the sections include a bottom rail 54 and a top rail 56, connected as by spaced spindles or dowels 58.

The sections 50 and 52 are slidable one on the other. As shown, the bottom and top rails of the section 50 have longitudinal slots 60. Collars 62 secured to the inner ends of the bottom and top rails of section 50 embrace the bottom and the top rails of section 52, and collars 64 on the inner ends of the bottom and top rails of section 52 embrace the bottom and top rails of section 50, and bolts 66 passed through the collars 64, the slots 60 in the bottom and top rails of sections 50, and the bottom and top rails of section 52 have thereon thumb screws 68.

The sections 50 and 52 are longitudinally adjustable and may be locked in adjusted position by tightening the thumb screws 68, and the top rails have cushions 70 on the outer ends thereof, so as to avoid injury to the finish of the side walls of the compartment.

The shield 48 is supported by oppositely disposed brackets 72 and 74 mounted for adjustment on the uprights 40. As shown, the brackets have sleeves 76 adapted to be clamped to the uprights and the sleeves have short arms 78 supporting loops 80 for the reception of the bottom and top rail of the shield.

A modification of the brackets for support of the uprights is illustrated in Figs. 5 and 7. In this modification a flat member 100 is adapted to be slipped between a support 102 and a seat 104, and the support has a lateral arm 106 bent over and downwardly parallel to the front face of the support and slotted as indicated at 108 for the reception of bolts for the attachment uprights 110.

While this invention has been described in connection with certain specific embodiments, the principle involved is susceptible of numerous other applications that will readily occur to persons skilled in the art.

Having thus described the various features of the invention, what I claim as new and desire to secure by Letters Patent is:

1. An attachment for a seat supported on a base, a pair of spaced resilient brackets having flat elongated shanks adapted to be slipped between the seat and the base, uprights supported by the brackets and a longitudinally adjustable shield supported on the uprights.

2. An attachment for a seat comprising a pair of brackets having flat elongated shanks adapted to be slipped beneath the seat, semi-flexible arms on the brackets, uprights secured to the semi-flexible arms, and an extendible shield supported on the uprights.

3. An attachment for a seat of an automobile comprising a pair of spaced brackets having flat elongated shanks adapted to be slipped beneath the seat, semi-flexible arms on the brackets extended downward and parallel to the front of the seat, uprights detachably secured to the semi-flexible arms and a shield having slidably connected sections detachably secured to the uprights.

4. An attachment for a seat of an automobile comprising spaced brackets each having a flat elongated part adapted to be slipped beneath the seat and a semi-flexible part extended downwardly at the front of the seat, uprights detachably secured to the semi-flexible parts, and a two part extensible shield adjustably supported on the uprights.

5. An attachment for a seat of an automobile comprising a pair of brackets having flat elongated shanks adapted to be slipped beneath the seat, semi-flexible arms on the brackets extended downwardly and parallel to the front of the seat, uprights detachably mounted on the arms, means for limiting the throw of the uprights, and a longitudinally extensible shield detachably and adjustably supported on the uprights.

6. An attachment for a seat of an automobile comprising a pair of brackets having flat elongated shanks adapted to be slipped beneath the seat and semi-flexible arms extended downwardly and in parallel relation to the front of the seat, detachable uprights adjustably supported on the arms, forwardly extended legs on the uprights for limiting the throw of the uprights, a longitudinally extensible shield slidable on the uprights, and means for locking the shield against movement.

LA VERNE R. BIASELL.

REFERENCES CITED

The following references are of record in the file of this patent:

UNITED STATES PATENTS

| Number | Name | Date |
| --- | --- | --- |
| 1,217,474 | MacGowan | Feb. 27, 1917 |
| 2,048,955 | Showalter | July 28, 1936 |